US009106495B2

(12) United States Patent
Kim et al.

(10) Patent No.: US 9,106,495 B2
(45) Date of Patent: Aug. 11, 2015

(54) WIRELESS COMMUNICATION METHOD AND APPARATUS BASED ON CHANNEL FUNCTION

(71) Applicant: Electronics and Telecommunications Research Institute, Daejeon (KR)

(72) Inventors: Kwang Seon Kim, Daejeon (KR); Min Soo Kang, Daejeon (KR); Bong Su Kim, Daejeon (KR); Woo Jin Byun, Daejeon (KR); Jong Soo Lim, Daejeon (KR); Myung Sun Song, Daejeon (KR); Jae Ick Choi, Daejeon (KR)

(73) Assignee: Electronics and Telecommunications Research Institute, Daejeon (KP)

( * ) Notice: Subject to any disclaimer, the term of this patent is extended or adjusted under 35 U.S.C. 154(b) by 0 days.

(21) Appl. No.: 14/547,243

(22) Filed: Nov. 19, 2014

(65) Prior Publication Data

US 2015/0146803 A1    May 28, 2015

(30) Foreign Application Priority Data

Nov. 28, 2013 (KR) .................. 10-2013-0146040
Oct. 7, 2014 (KR) .................. 10-2014-0134819

(51) Int. Cl.
*H04L 27/04* (2006.01)
*H04L 27/26* (2006.01)
*H04L 25/02* (2006.01)

(52) U.S. Cl.
CPC ........ *H04L 27/2627* (2013.01); *H04L 25/0204* (2013.01); *H04L 27/2649* (2013.01)

(58) Field of Classification Search
CPC ......... H04L 1/20; H04L 1/206; H04L 1/0001; H04L 1/0003; H04L 1/0002; H04L 1/0004; H04L 1/0009; H04L 5/02; H04L 5/023
USPC ......... 375/295, 316, 259, 260, 285, 296, 299, 375/346, 340, 347, 349
See application file for complete search history.

(56) References Cited

U.S. PATENT DOCUMENTS

| 2002/0136278 A1* | 9/2002 | Nakamura et al. ............ 375/148 |
| 2009/0034647 A1* | 2/2009 | Shirakata et al. ............. 375/285 |
| 2009/0196279 A1* | 8/2009 | Kim et al. ..................... 370/350 |
| 2013/0077502 A1* | 3/2013 | Gainey et al. ................. 370/252 |

FOREIGN PATENT DOCUMENTS

KR            100849330 A         7/2008

* cited by examiner

*Primary Examiner* — Siu Lee
(74) *Attorney, Agent, or Firm* — William Park & Associates Ltd.

(57) ABSTRACT

Disclosed are a wireless communication method of improving frequency efficiency based on a channel function in a wireless communication system and an apparatus thereof. The wireless communication system using a digital modulation scheme, includes: a transmitting apparatus which modulates a data signal to generate a modulation symbol, generates a channel symbol function corresponding to the modulation symbol, combines the modulation symbol with the channel symbol function to generate a transmission symbol to transmit the generated transmission symbol through a transmission antenna; and a receiving apparatus which receives the transmission symbol through a reception antenna, estimates a channel symbol function included in the transmission symbol, and extracts the data signal based on the modulation symbol included in the transmission symbol.

20 Claims, 6 Drawing Sheets

WIRELESS COMMUNICATION METHOD AND APPARATUS BASED ON CHANNEL FUNCTION

Priority to Korean patent application number 10-2013-0146040 filed on Nov. 28, 2013 and 10-2014-0134819 filed on Oct. 7, 2014, the entire disclosure of which is incorporated by reference herein, is claimed.

BACKGROUND OF THE INVENTION

1. Field of the Invention

The present invention relates to wireless communication, and more particularly, to a wireless communication method of improving frequency efficiency based on a channel function in a wireless communication system and an apparatus thereof.

2. Related Art

A technology of increasing frequency efficiency to transmit data at a high rate basically includes a technology of increasing a modulation level of communication and an MIMO technology of using a multiple antenna. The technology of increasing a modulation level of communication supports 1024 Quadrature Amplitude Modulation (QAM) together with development of a hardware design technology. However, since such a technology requires a high Signal to Noise Ratio (SNR), a transmission distance is restrictive and the technology is sensitive to a channel environment.

Meanwhile, a Multiple Input Multiple Output (MIMO) technology is a technology of increasing frequency efficiency using orthogonality of a spatial channel function. The MIMO technology includes a spatial multiplexing technology which is a technology of linearly increasing a maximum transmission rate proportional to the number of antennas. According to the MIMO technology, if the number of used transceiver antennas and RF transceivers is increased by N times, the frequency efficiency of maximum N times may be increased. However, in this case, since N different signals interfere with other, a high SNR is required. In order know channel information corresponding to each antenna, a complex channel estimation scheme or a complex reception algorithm for obtaining an inverse of a channel matrix is required. Further, in a systematic aspect, since a plurality of Radio Frequency (RF) transceivers and a plurality of antennas are required, power consumption is increased and an installation space is limited. Moreover, since an orthogonal channel function should be created, the MIMO technology is sensitive to characteristics of a real communication channel environment.

In order to solve the above problem, a spatial modulation technology of coding a path of signals transmitted from different antennas may be used. The spatial modulation technology may improve the frequency efficiency by coding an orthogonal channel using a channel function. However, the spatial modulation technology needs a plurality of antenna, and may be implemented by one transceiver based on a single carrier scheme. In order to support a multiple subcarrier based transmission scheme such as Orthogonal Frequency Division Multiplexing (OFDM), since channel coding should be performed by a plurality of sub-carriers, there may be a demand for the same number of RF transceivers by the corresponding number of antennas as in the MIMO technology. In this case, the OFDM is a scheme which carries data in a plurality of orthogonal sub-carriers and multiplexes the sub-carriers to perform wireless communication. In this case, in order to ensure orthogonality between the sub-carriers, the sub-carriers may be arranged on a frequency axis so that an interval between the sub-carriers satisfies $\Delta f = 1/T_g$. The $T_g$ represents a modulation symbol duration per sub-carrier.

Accordingly, there is a need for a technology of increasing frequency efficiency using a single transceiver.

SUMMARY OF THE INVENTION

The present invention has been made in view of the above problems, and provides a wireless communication method based on a channel function, and an apparatus thereof.

The present invention further provides a wireless communication method based on application of data modulation and a selective channel function, and an apparatus thereof.

The present invention further provides a wireless communication method capable of increasing frequency efficiency based on a single transceiver, and an apparatus thereof.

The present invention further provides a method and an apparatus for applying an adaptive channel modulation rate and a selective channel function.

In accordance with an aspect of the present invention, a wireless transmitting apparatus using a digital modulation scheme, included: a serial/parallel converter which converts input serial data into parallel data signals; a data modulator which modulates the parallel data signals to generate modulation symbols; a channel modulator which generates a channel symbol function corresponding to each modulation symbol; a symbol combiner which combines each modulation symbol with the channel symbol function corresponding to the modulation symbol to generate a transmission symbol; and a radio frequency (RF) which transmits the generated transmission symbol to a receiving apparatus through an antenna.

In accordance with another aspect of the present invention, a wireless receiving apparatus using a digital modulation scheme, includes: a radio frequency (RF) receiver which receives a transmission symbol transmitted from a transmitting apparatus through an antenna; a channel estimator which estimates a channel symbol function included in the transmission symbol; a channel demodulator which demodulates the channel symbol function included in the transmission symbol based on the estimation to extract a channel function; and a data demodulator which demodulates a modulation symbol included in the transmission symbol based on the estimation to extract a data signal.

In accordance with another aspect of the present invention, wireless communication system using a digital modulation scheme, includes: a transmitting apparatus which modulates a data signal to generate a modulation symbol, generates a channel symbol function corresponding to the modulation symbol, combines the modulation symbol with the channel symbol function to generate a transmission symbol to transmit the generated transmission symbol through a transmission antenna; and a receiving apparatus which receives the transmission symbol through a reception antenna, estimates a channel symbol function included in the transmission symbol, and extracts the data signal based on the modulation symbol included in the transmission symbol.

According to the present invention, even when a single RF transceiver and a single antenna are used, higher frequency efficiency may be obtained as compared with a case of applying an existing modulation scheme. Further, since the present invention uses a preset channel function, the present invention may be insensitive to a channel environment and may represent an excellent performance even in a LOS environment such as a fixed point-to-point communication.

The present invention may be implemented by only one transceiver regardless of based on a single carrier scheme or based on an OFDM scheme, and an additional device such as a high speed switch is not required.

Moreover, according to the present invention, since a modulation rate is not fixed according to the number of antennas and the number of channel functions may be adaptively changed, an optimal performance may be implemented according to variation of the channel environment and reception sensitivity.

In addition, since the present invention is realized by various channel functions, the present invention may be extended and applied in an MIMO form.

BRIEF DESCRIPTION OF THE DRAWINGS

The objects, features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A wireless communication system may use a frequency efficiency improving technology of transmitting data at a high rate. The frequency efficiency improving technology includes a technology of increasing a modulation level of communication or an MIMO technology of using a multiple antenna. The technology of increasing a modulation level of communication is developed together with development of a hardware design technology, and is currently developed to support 1024 Quadrature Amplitude Modulation (QAM). However, since such a technology requires a high Signal to Noise Ratio (SNR), a transmission distance is limited and the technology is sensitive to a channel environment. For example, upon comparing quadrature phase shift keying (QPSK) with 64QAM, there is the difference of about 13 dB in the SNR based on BER (bit error rate) $10^{-6}$. Assuming that the channel environment is the same as the system, there is the difference in a transmission distance of about 20 times.

Meanwhile, in a case of the MIMO technology of increasing frequency efficiency using the orthogonality of the spatial channel function, the MIMO technology is extensively used to linearly increase a maximum transmission speed proportional to the number of antennas.

Figure 1:
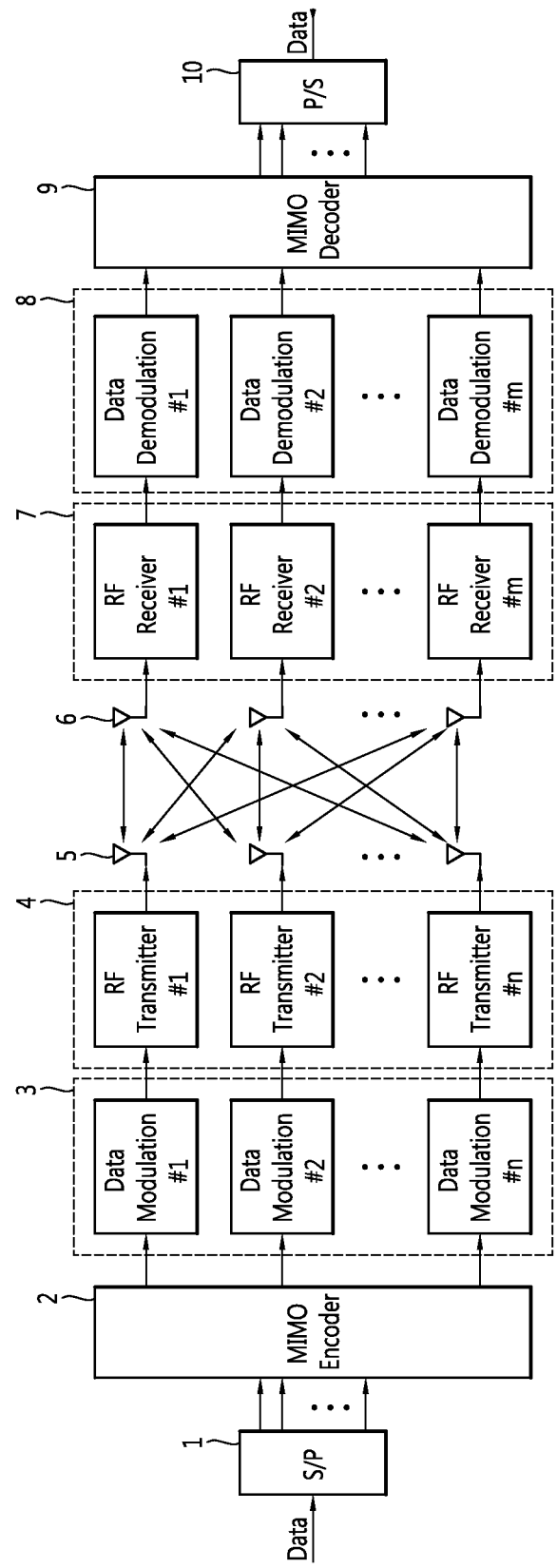
FIG. 1 illustrates an example of a configuration of a system using an MIMO technology.

FIG. 1 illustrates an example of a configuration of a system using an MIMO technology.

Referring to FIG. 1, a transmitting apparatus for supporting the MIMO technology includes a serial/parallel (S/P) converter 1, an MIMO encoder 2, a data modulator 3, a plurality of RF transmitters 4, and a plurality of antennas 5.

The S/P converter 1 converts input serial data into parallel data signals to transfer the parallel data signals to the MIMO encoder 2. The MIMO encoder 2 encodes the parallel data signals according to a preset algorithm. The data modulator 3 processes the encoded signals to generate modulation symbols. The data modulator 3 may include a plurality of modulation blocks. The plurality of RF transmitters 4 may be connected to the plurality of antennas 5, respectively, and transmit the modulation symbols to the receiving apparatus through a connected antenna.

Meanwhile, a receiving apparatus for supporting the MIMO technology includes a plurality of antennas 6, a plurality of RF receivers 7, a data demodulator 8, an MIMO decoder 9, and a parallel/serial (P/S) converter 10.

The plurality of RF receivers 7 receives the modulation symbols provided from the transmitting apparatus through a plurality of antennas 6 which are connected to each other, and transfer the modulation symbols to the data demodulator 8. The data demodulator 8 may include a plurality of demodulation blocks. The data demodulator 8 demodulates the modulation symbols, and extracts the encoded signals to transfer the extracted signals to the MIMO decoder 9. The MIMO decoder 9 decodes the encoded signals according to a preset algorithm to extract parallel data signals. The P/S converter 10 extracts original data based on the parallel data signals.

In the MIMO system, if the number of pairs of the RF transmitters 4 and the antennas 5 and the number of pairs of the RF receivers 7 and the antennas 6 are increased by N times, a frequency efficiency improving effect of maximum N times may be obtained. Since a plurality of MIMO signals may interfere with each other, there may be a demand for a higher SNR. In order to known channel information corresponding to each MIMO connected transmission/reception antennas, a complex channel estimation scheme is necessary in the MIMO encoder 2 and the MIMO decoder 9. There is a need for a complex reception algorithm to exactly obtain an inverse of a channel matrix. In a hardware side of the system, since a plurality of RF transmitters/receivers are required, power consumption is increased and an installation space is limited. In addition, in order to increase frequency efficiency based on the MIMO technology, since an orthogonal channel function should be basically configured, the MIMO system is sensitive to a real communication channel environment. In addition, since a plurality of RF transmitters/receivers are used, when there is the difference in a performance between a plurality of RF transmitters/receivers, performance degradation may occur and required power consumption is increased.

So as to solve the above problems, a spatial modulation technology of encoding a path of signals transmitted from different antennas may be used. The spatial modulation technology is a technology capable of improving the frequency efficiency by coding an orthogonal channel using a channel function. In this case, the channel function may use a channel function applied to the MIMO technology. Although the spatial modulation technology uses a plurality of transmission antennas as in the MIMO, the spatial modulation technology may perform transmission by selecting one antenna at one symbol duration. According to the spatial modulation technology, a transmission end selects an antenna to which different channel functions are applied according to a digital value of an input signal and maps a symbol through signal modulation. A reception end may improve frequency efficiency through a received signal demodulation by taking into consideration a transmission antenna index.

Figure 2:
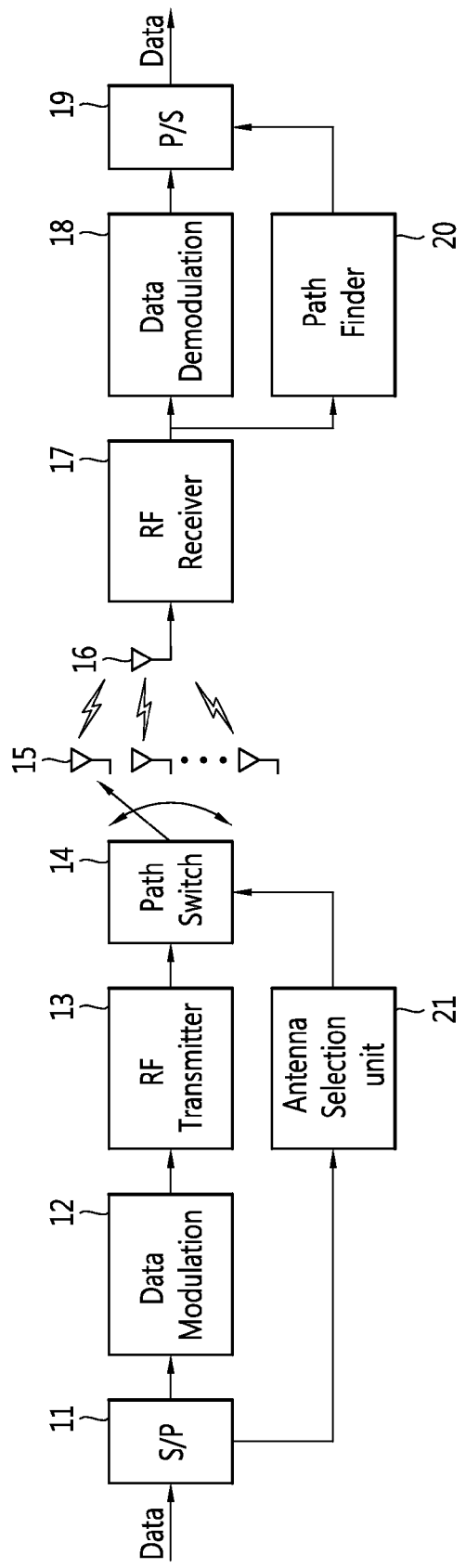
FIG. 2 illustrates an example of a configuration of a wireless transmitting apparatus and a wireless receiving apparatus using a spatial modulation technology based on a single carrier scheme.

FIG. 2 illustrates an example of a configuration of a wireless transmitting apparatus and a wireless receiving apparatus using a spatial modulation technology based on a single carrier scheme.

Referring to FIG. 2, a transmitting apparatus using a spatial modulation technology includes an S/P converter 11, a data modulator 12, an RF transmitter 13, a path switch 14, a plurality of antennas 15, and an antenna selection unit 21. A receiving apparatus using a spatial modulation technology includes an antenna 16, an RF receiver 17, a data demodulator 18, a path finder 20, and a P/S converter 19.

The transmitting apparatus uses a plurality of antennas due to the spatial modulation technology. However, since the transmitting apparatus is based on a single carrier scheme, an antenna selection unit 21 selects one from the plurality of antennas 15, and the path switch 14 connects the RF transmitter 13 to the selected antenna 15, and a signal is transmitted through the selected antenna, only one RF transmitter 13 is required. Further, in the receiving apparatus, the path finder 20 may find (or estimate) a channel and a path corresponding to a symbol duration based on information received from a base station and a preset algorithm. Based on this, one RF receiver may receive a signal transmitted from the transmitting apparatus.

However, in a case of the above method, since path switching is achieved in a symbol duration unit, a high speed switch is required. If the transmitting apparatus is based on an OFDM scheme, in order to increase the whole frequency efficiency, since a different transmission antenna is selected by sub-carriers, there is a need for a plurality of RF transmitters.

Figure 3:
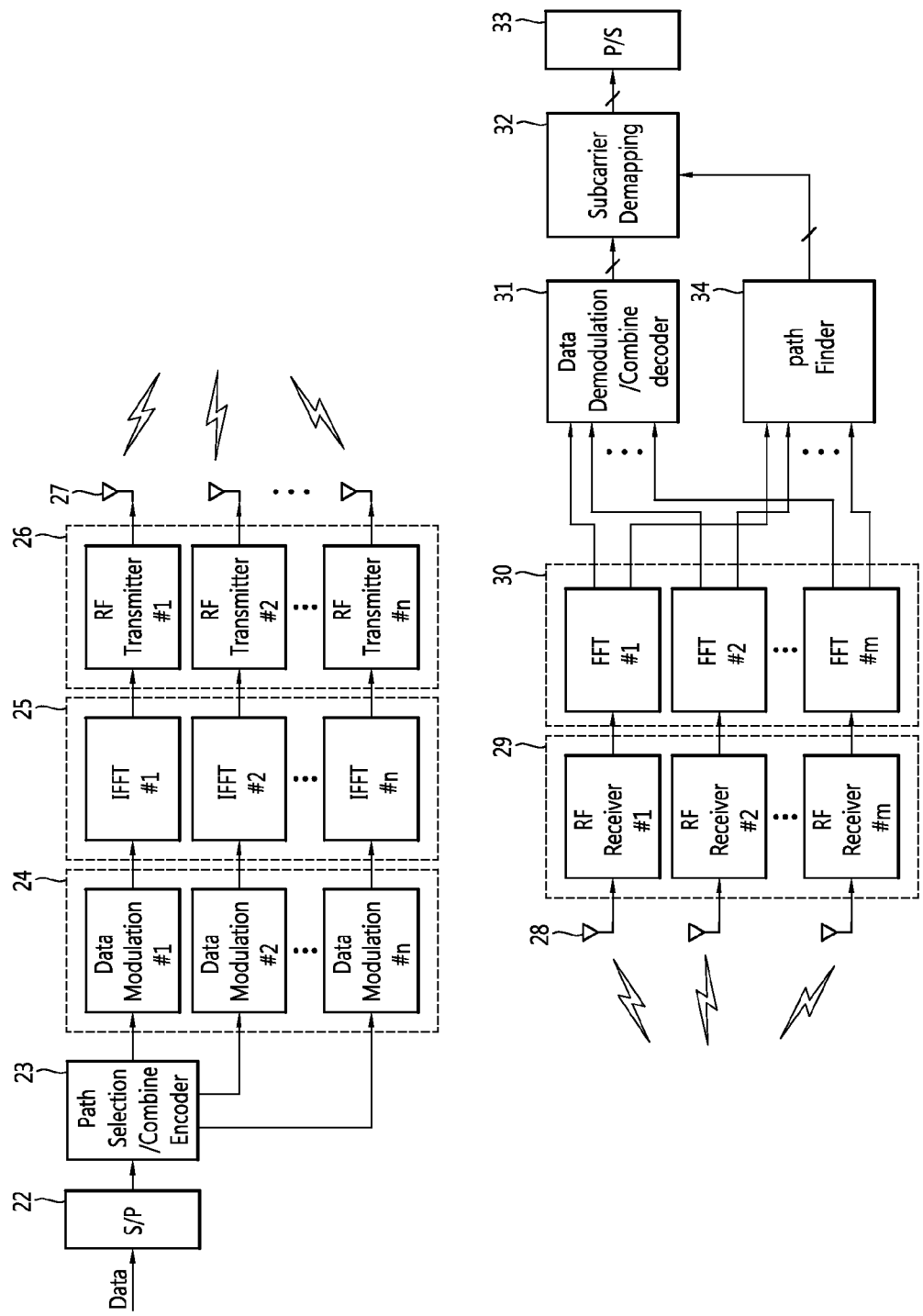
FIG. 3 illustrates an example of a configuration of a wireless transmitting apparatus and a wireless receiving apparatus using a spatial modulation technology based on an OFDM.

FIG. 3 illustrates an example of a configuration of a wireless transmitting apparatus and a wireless receiving apparatus using a spatial modulation technology based on an OFDM.

Referring to FIG. 3, the transmitting apparatus includes an S/P converter 22, a path selection/combine encoder 23, a data modulator 24, an Inverse Fast Fourier Transform (IFFT) unit 25, a plurality of RF transmitters 26, and a plurality of antennas 27. The receiving apparatus includes a plurality of antennas 28, a plurality of RF receivers 29, a Fast Fourier Transform (FFT) unit 30, a data demodulation/combine decoder 31, a path finder 34, a subcarrier demapping unit 32, and a P/S converter 33. The IFFT unit 25 of the transmitting apparatus may generate temporal domain signals by performing an IFFT algorithm with respect to input modulated parallel data signals, and transmits the temporal domain signals to an RF transmitter 26 corresponding to each subcarrier. The FFT unit 30 of the receiving apparatus generates parallel frequency domain signals by performing an FFT algorithm with respect to a parallel signal received by the plurality of RF receivers 29.

When a spatial modulation technology based on an OFDM is used, the IFFT unit 25 and the FFT unit 30 may require the same number of IFFT blocks and FFT blocks by the corresponding number of transmission antennas, and there is a need for a plurality of RF transmitters 26 and a plurality of RF receivers 29, a hardware advantage is not greater than that of an existing MIMO technology. In addition, in this case, in order to improve the frequency efficiency by M bits, since there is a demand for the number of antennas corresponding to $2^M$, a plurality antenna spaces are required.

Meanwhile, when a spatial modulation technology based on a single carrier scheme as illustrated in FIG. 2 is used, a signal may be transmitted as follows.

Figure 4:
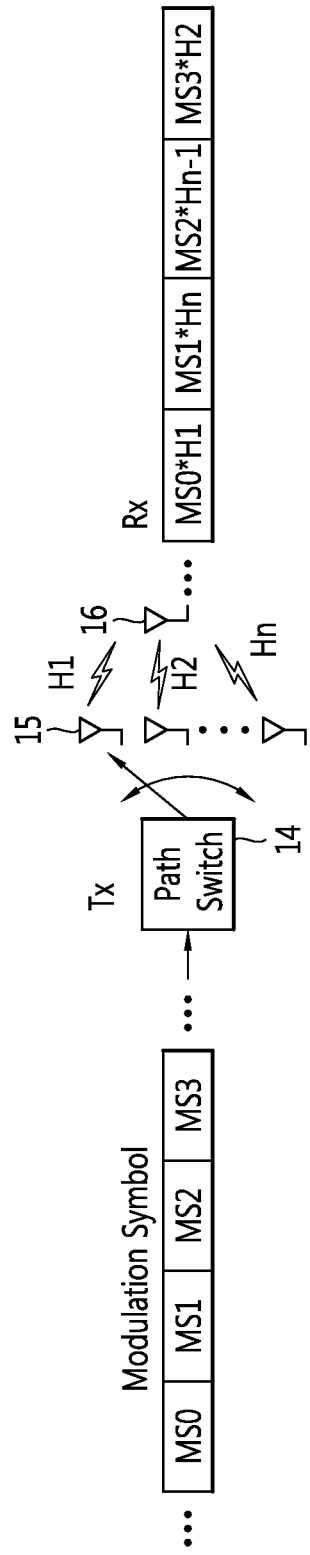
FIG. 4 illustrates an example of signal transmission when a spatial modulation technology based on a single carrier scheme is used.

FIG. 4 illustrates an example of signal transmission when a spatial modulation technology based on a single carrier scheme is used.

Referring to FIG. 4, an MS represents a modulation symbol, and an H represents a channel symbol with respect to a (transmission) channel. The channel is formed between each antenna 15 and a reception end antenna 16.

In a case of modulation symbols, the modulation symbols are transmitted to an antenna 16 of a reception end through one of a plurality of antennas 15 of a transmission end from a modulation symbol at a left side of a time axis. In this case, one of the plurality of antennas 15 of the transmission end may be connected by the path switch 14. In this case, the connected antenna may be changed in a symbol unit. In this case, an antenna selecting unit (not shown) of a transmission end may select an antenna according to a path selection algorithm of a modulation symbol. In the same time, one may be selected from the plurality of antennas 15 of the transmission end to transmit a modulation symbol. In this case, in a side of the reception end, a signal is continuously received in a combination form of one modulation symbol and one path function (channel symbol).

Figure 5:
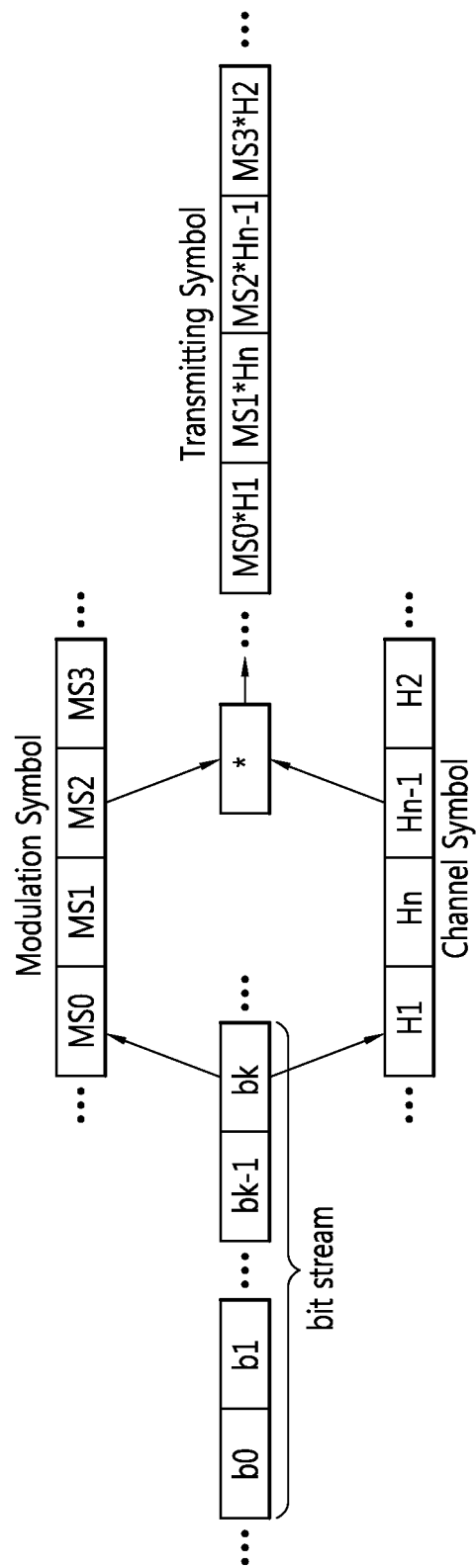
FIG. 5 illustrates an example of a signal transmission form.

FIG. 5 illustrates an example of a signal transmission form.

Referring to FIG. 5, a data bit stream input to the transmitting apparatus is generated as modulation symbols through encoding and modulation, and generated modulation symbols are transmitted through a channel defined according to each algorithm. Accordingly, since one modulation symbol is combined with one path function (channel symbol) in a unit time in a time side, the transmitting apparatus does not use a plurality of antennas, a preset path function between the transmitting apparatus and the receiving apparatus is combined with the modulation symbol so that a transmitting symbol form is sent, thereby obtaining an effect of using a plurality of antennas. That is, in a side of the receiving apparatus, the modulation symbol may be received through a various path functions. Since the path function is a frequency functions, convolution operation of the path function (channel symbol) is applied to the modulation symbol in a time domain or the modulation symbol is multiplied by the path function in a frequency domain and an IFFT may be performed.

That is, the present invention may obtain high frequency efficiency by combining a path function defined between the transmitting apparatus and the receiving apparatus with the modulation symbol. When the frequency efficiency according to the present invention is represented as a transmission bit per unit symbol, the frequency efficiency may be expressed by a following equation 1.

$$\text{Transmission bit per unit symbol} = \log_2(M) + \log_2(N) \quad \text{[Equation 1]}$$

In the equation 1, the M represents a QAM factor (or modulation level). For example, the M may be 16, 32, 64, 256, or 1024. The N represents the number of multiple path functions between the transmission end and the reception end.

Figure 6:
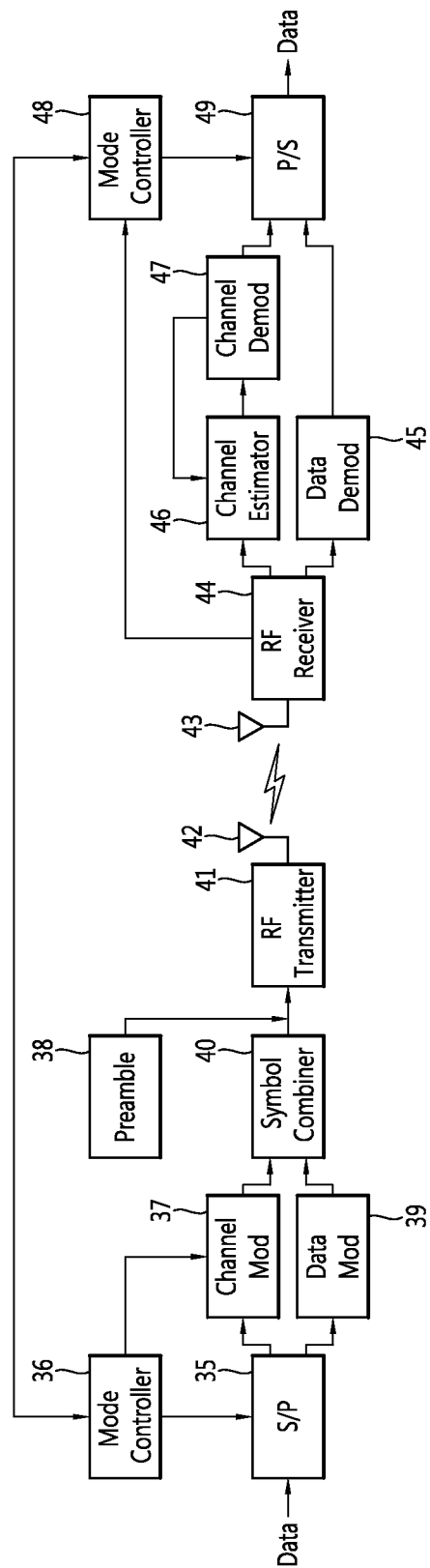
FIG. 6 illustrates an example of a configuration a system to which a frequency efficiency increasing technology is applied according to another exemplary embodiment of the present invention.

FIG. 6 illustrates an example of a configuration a system to which a frequency efficiency improving technology is applied according to another exemplary embodiment of the present invention.

Referring to FIG. 6, the transmitting apparatus according to the present invention includes an S/P converter 35, a mode controller 36, channel modulator 37, a data modulator 39, a symbol combiner 40, preamble insertion unit 38, an RF transmitter 41, and an antenna 42. A receiving apparatus according to the present invention includes an antenna 43, an RF receiver 44, a data demodulator 45, a channel estimator, 46, a channel demodulator 47, a mode controller 48, and a P/S converter 49.

In the transmitting apparatus according to the present invention, the S/P converter 35 converts input data into parallel data signals. In this case, the S/P converter 35 may separate the input data according to a type and a spatial modulation rate of data. The data modulator 39 modulates input parallel data signals to generate modulation symbols. The channel modulator 37 selects a channel symbol function corresponding to a modulation symbol. The symbol combiner 40 combines the modulation symbol with a channel symbol function corresponding to the modulation symbol to generate a transmission symbol. Since the channel symbol function is the frequency function, the symbol combiner 40 may multiply the channel symbol function by the modulation symbol in a frequency domain to convert the multiplication result into a time domain. Alternatively, the symbol combiner 40 may use various methods by converting the modulation symbol and the channel symbol function into a time domain to combine the converted modulation symbol with the converted channel symbol function using a convolution function. The preamble insertion unit 38 may insert a preamble into the transmission symbol. In this case, the preamble may include information on the channel symbol function included in the transmission symbol. The RF transmitter 41 transmits an input transmission symbol to the receiving apparatus through the antenna 42.

The receiving apparatus receives a signal (transmission symbol) transmitted from a transmitting apparatus through an antenna 43. In detail, the RF receiver 44 receives the transmission symbol through the antenna 43. In this case, the channel estimator 46 estimates a channel according to a preset algorithm, and determines (or estimates) a channel symbol function included in the transmission symbol. The channel demodulator 47 demodulates the channel symbol function to extract a channel function and to acquire channel information. The data demodulator 45 demodulates a modulation symbol included in the transmission symbol to extract a parallel data signal. The P/S converter 49 may combine or serially convert the parallel data signal and the channel function according to the preset algorithm to extract original data.

The transmitting apparatus and the receiving apparatus according to the present invention include a mode controller 36 and a mode controller 48, respectively. The mode controller 36 and the mode controller 48 determine and control a channel function (or channel symbol function) according to a preset protocol or algorithm. For example, the mode controller 36 and the mode controller 48 determine a ratio of data modulation to channel modulation (path modulation) at a first duration of a wireless frame, and determine or find a channel function applied to each modulation symbol according to a preset protocol or algorithm based on the determined ratio of the data modulation to the channel modulation. The mode controller 36 may control the channel modulator 37 and the mode controller 48 may control the channel estimator 46 and the channel demodulator 47. The mode controller 36 and the mode controller 48 may change and control a rate of data modulation and channel modulation by taking into consideration a SNR or a variation situation of a channel environment based on the above preamble or the determination result of the channel estimator 46.

As described above, according to the present invention, even when a single RF transceiver and a single antenna are used, the higher frequency efficiency may be obtained as compared with an existing modulation scheme. Further, since the present invention uses a preset channel function, the present invention may be insensitive to a channel environment and may represent an excellent performance even in a LOS environment such as a fixed point-to-point communication. The present invention may be implemented by only one transceiver regardless of based on a single carrier scheme or based on an OFDM scheme, and an additional device such as a high speed switch is not required.

Moreover, according to the present invention, since a modulation rate is not fixed according to the number of antennas and the number of channel functions may be adaptively changed, an optimal performance may be implemented according to variation of the channel environment and reception sensitivity. That is, according to the present invention, the number of transceiver antennas may not be proportional to the number of channel paths in the reception end.

In addition, the present invention is applicable to a single carrier scheme and an OFDM scheme. In this case, the channel modulator and the channel demodulator may calculate a channel function by modulation symbols in each subcarrier unit.

In addition, since the present invention is realized by various channel functions, the present invention may be extended and applied in an MIMO form.

Although the present invention has been described with reference to a number of illustrative embodiments thereof, it should be understood that numerous other modifications and embodiments can be devised by those skilled in the art that will fall within the spirit and scope of the principles of the present invention. More particularly, various variations and modifications are possible in the component parts and/or arrangements of the subject combination arrangement within the scope of the present invention, the drawings and the appended claims. In addition to variations and modifications in the component parts and/or arrangements, alternative uses will also be apparent to those skilled in the art.

What is claimed is:

1. A wireless transmitting apparatus using a digital modulation scheme, the apparatus comprising:
    a serial/parallel converter which converts input serial data into parallel data signals;
    a data modulator which modulates the parallel data signals to generate modulation symbols;
    a channel modulator which generates a channel symbol function corresponding to each modulation symbol;
    a symbol combiner which combines each modulation symbol with the channel symbol function corresponding to the modulation symbol to generate a transmission symbol; and
    a radio frequency (RF) transmitter which transits the generated transmission symbol to a receiving apparatus through an antenna.

2. The wireless transmitting apparatus of claim 1, wherein the symbol combiner combines the modulation symbol with the channel symbol function by multiplying the modulation symbol by the channel symbol function in a frequency domain, and converts the combination result into a time domain to generate the transmission symbol.

3. The wireless transmitting apparatus of claim 1, wherein the symbol combiner generates the transmission symbol by converting the modulation symbol and the channel symbol function into a time domain to combine the converted modulation symbol with the converted channel symbol function using a convolution calculation.

4. The wireless transmitting apparatus of claim 1, further comprising a mode controller which determines the channel symbol function corresponding to the each modulation symbol.

5. The wireless transmitting apparatus of claim 4, wherein number of all channel symbol functions differs from number of channel paths between the transmitting apparatus and the receiving apparatus.

6. The wireless transmitting apparatus of claim 4, wherein the mode controller controls a data modulation rates, the data modulator generates the modulation symbols based on the data modulation rate, and the data modulation rate is controlled based on a signal to noise ratio and a transfer characteristic of channels.

7. The wireless transmitting apparatus of claim 4, wherein the mode controller controls a channel modulation rate, the channel modulator generates the modulation symbols based on the channel modulation rate, and the channel modulation rate is controlled based on a signal to noise ratio and a transfer characteristic of a channel.

8. A wireless receiving apparatus using a digital modulation scheme, the apparatus comprising:
- a radio frequency (RF) receiver which receives a transmission symbol transmitted from a transmitting apparatus through an antenna;
- a channel estimator which estimates a channel symbol function included in the transmission symbol;
- a channel demodulator which demodulates the channel symbol function included in the transmission symbol based on the estimation to extract a channel function; and
- a data demodulator which demodulates a modulation symbol included in the transmission symbol based on the estimation to extract a data signal.

9. The wireless receiving apparatus of claim 8, comprising a mode controller which determines the channel symbol function corresponding to the modulation symbol.

10. The wireless receiving apparatus of claim 9, wherein number of all channel symbol functions differs from number of channel paths between the transmitting apparatus and the receiving apparatus.

11. The wireless receiving apparatus of claim 9, wherein the mode controller controls a data modulation rate, and the data demodulator demodulates the modulation symbol based on the data modulation rate.

12. The wireless receiving apparatus of claim 11, wherein the mode controller controls the data modulation rate based on a signal to noise ratio and a transfer characteristic of a channel.

13. The wireless receiving apparatus of claim 9, wherein the mode controller controls a channel modulation rate, and the channel demodulator demodulates the channel symbol function based on the channel modulation rate.

14. The wireless receiving apparatus of claim 13, wherein the mode controller controls the channel modulation rate based on a signal to noise ratio and a transfer characteristic of a channel.

15. A wireless communication system using a digital modulation scheme, the system comprising:
- a transmitting apparatus which modulates a data signal to generate a modulation symbol, generates a channel symbol function corresponding to the modulation symbol, combines the modulation symbol with the channel symbol function to generate a transmission symbol to transmit the generated transmission symbol through a transmission antenna; and
- a receiving apparatus which receives the transmission symbol through a reception antenna, estimates the channel symbol function included in the transmission symbol, and extracts the data signal based on the modulation symbol included in the transmission symbol.

16. The wireless communication system of claim 15, wherein the transmitting apparatus combines the modulation symbol with the channel symbol function by multiplying the modulation symbol by the channel symbol function in a frequency domain to generate the transmission symbol, and converts the generated transmission symbol into a time domain to transmit the converted symbol through a transmission antenna.

17. The wireless communication system of claim 15, wherein the transmitting apparatus converts the modulation symbol and the channel symbol function into a time domain to combine the converted modulation symbol with the converted channel symbol function using a convolution calculation.

18. The wireless communication system of claim 15, wherein the receiving apparatus comprises a channel estimator, and the channel estimator estimates a channel symbol function included in the transmission symbol according to a preset algorithm.

19. The wireless communication system of claim 15, wherein number of channel paths between the transmission antenna and the reception antenna differs from number of the channel symbol functions.

20. The wireless communication system of claim 15, wherein the transmitting apparatus and the receiving apparatus control a data modulation rate and a channel modulation rate based on a signal to noise ratio and a transfer characteristic of a channel.

* * * * *